(12) United States Patent
Hashimoto

(10) Patent No.: US 7,417,775 B2
(45) Date of Patent: Aug. 26, 2008

(54) IMAGE FORMING APPARATUS

(75) Inventor: Shinichi Hashimoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 367 days.

(21) Appl. No.: 11/276,764

(22) Filed: Mar. 14, 2006

(65) Prior Publication Data

US 2007/0216084 A1  Sep. 20, 2007

(51) Int. Cl.
*H04N 1/04* (2006.01)
*B65H 5/12* (2006.01)

(52) U.S. Cl. .................. 358/496; 358/498; 399/388; 271/266

(58) Field of Classification Search ............ 399/68, 399/16, 388; 358/498, 496, 296; 271/264, 271/266, 265.01, 270
See application file for complete search history.

(56) References Cited

U.S. PATENT DOCUMENTS

| | | | | |
|---|---|---|---|---|
| 4,506,301 A | * | 3/1985 | Kingsley et al. | 358/2.1 |
| 5,068,690 A | * | 11/1991 | Nakatani et al. | 399/184 |
| 6,807,383 B2 | * | 10/2004 | Kawagoe | 399/45 |
| 7,099,054 B2 | * | 8/2006 | Shih et al. | 358/474 |
| 2002/0054379 A1 | * | 5/2002 | Yamaguchi | 358/498 |
| 2005/0122544 A1 | * | 6/2005 | Mizuhashi et al. | 358/1.18 |

FOREIGN PATENT DOCUMENTS

| | | |
|---|---|---|
| JP | 6/102727 A | 4/1994 |
| JP | 2000/255841 A | 9/2000 |

* cited by examiner

*Primary Examiner*—Kaitlin S Joerger
(74) *Attorney, Agent, or Firm*—Global IP Counselors, LLP

(57) ABSTRACT

An image forming apparatus comprises a paper feeder controller, a scanner and a printing controller. The paper feeder controller executes first paper and second paper feeding processes. The scanner executes a manuscript scanning process for optically scanning a manuscript and a graphics editing process for editing scanned image, transmits a first paper feeding start request at timing between start of the manuscript scanning process and completion of the graphics editing process, and transmits a second paper feeding start request after the graphics editing process is completed. The first paper feeding start request is for making the paper feeder controller start the first paper feeding process, and the second paper feeding start request is for making the paper feeder controller start the second paper feeding process. The printing controller receives the first paper feeding start request and the second paper feeding start request from the scanner and controls the paper feeder controller based on the first paper feeding start request or the second paper feeder start request.

12 Claims, 6 Drawing Sheets

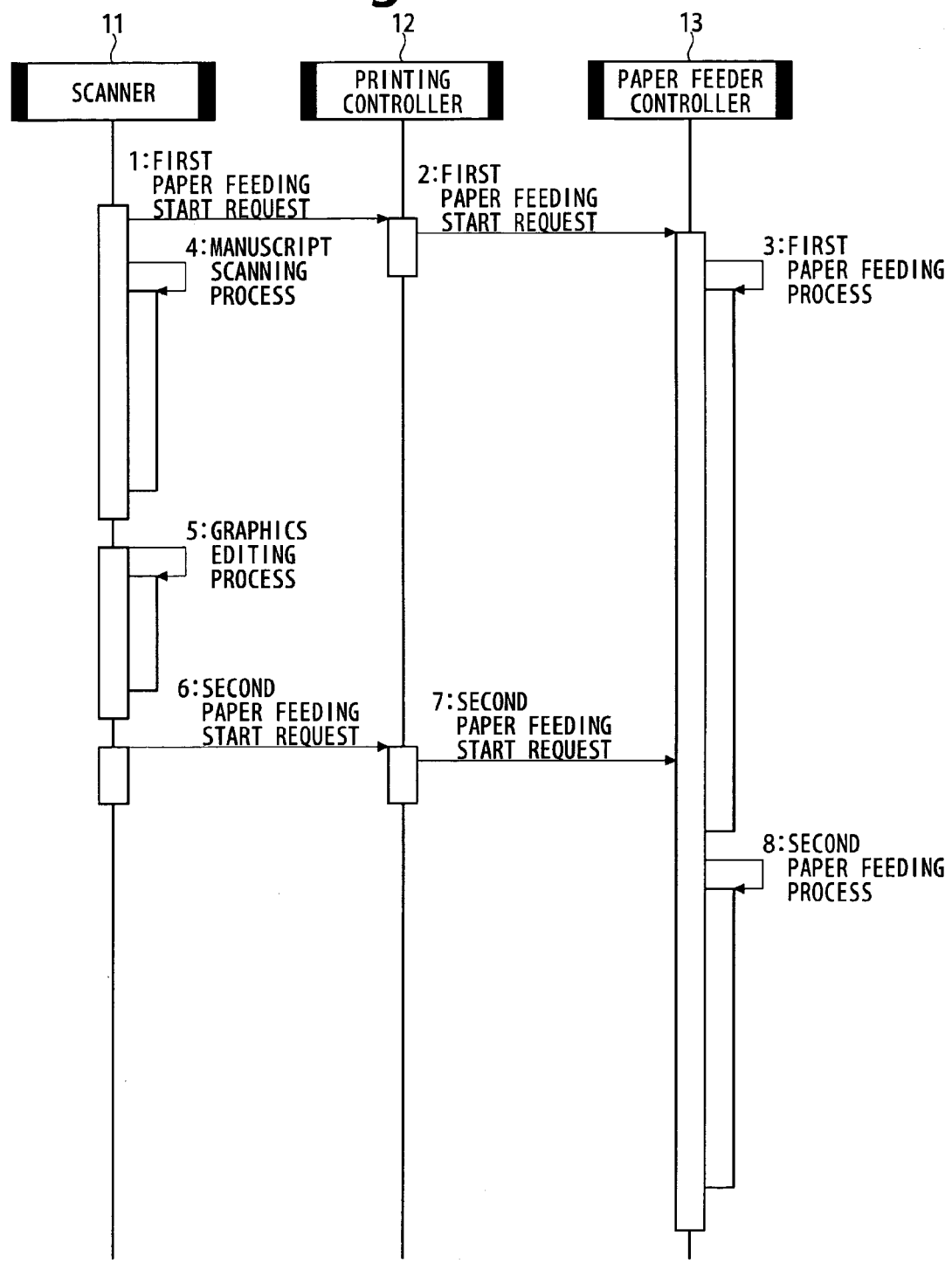

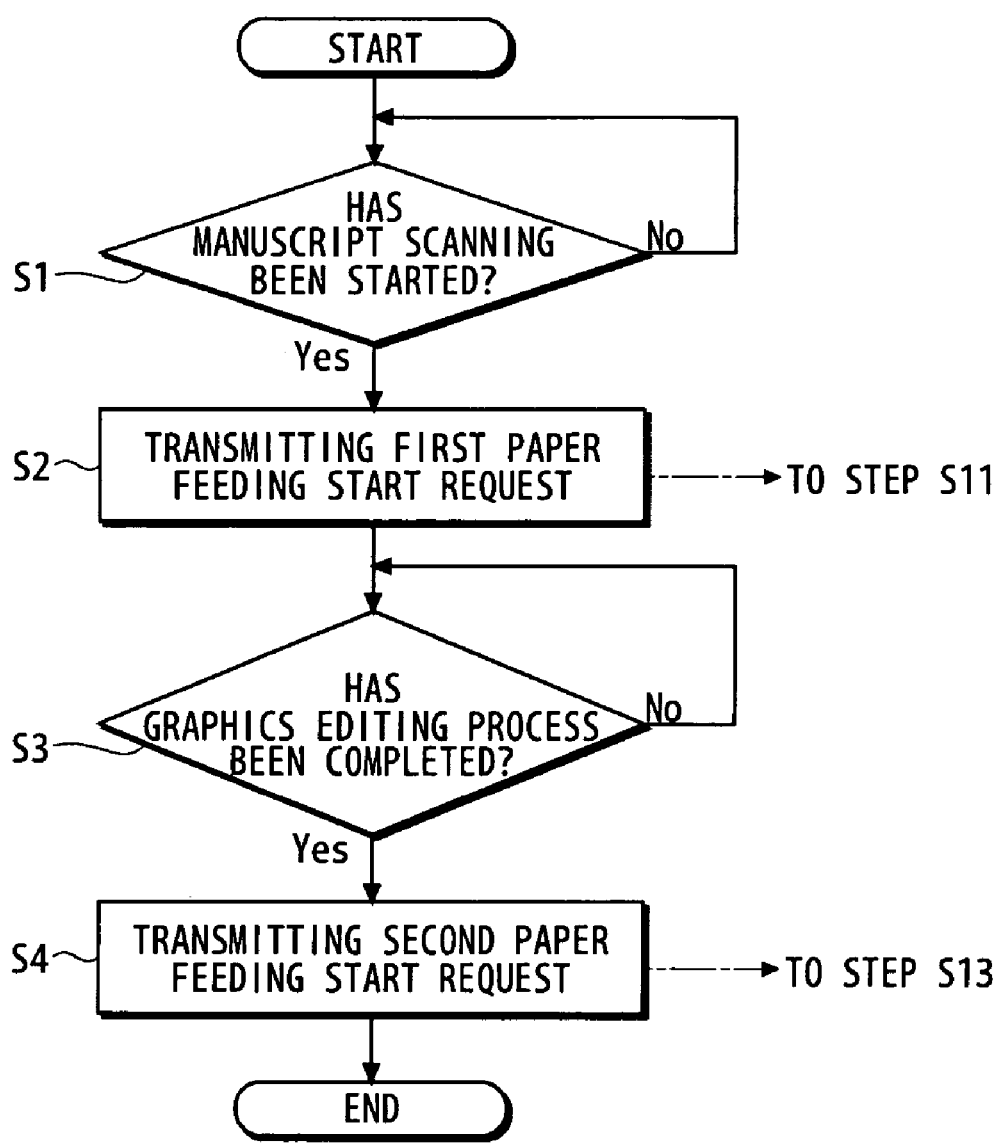

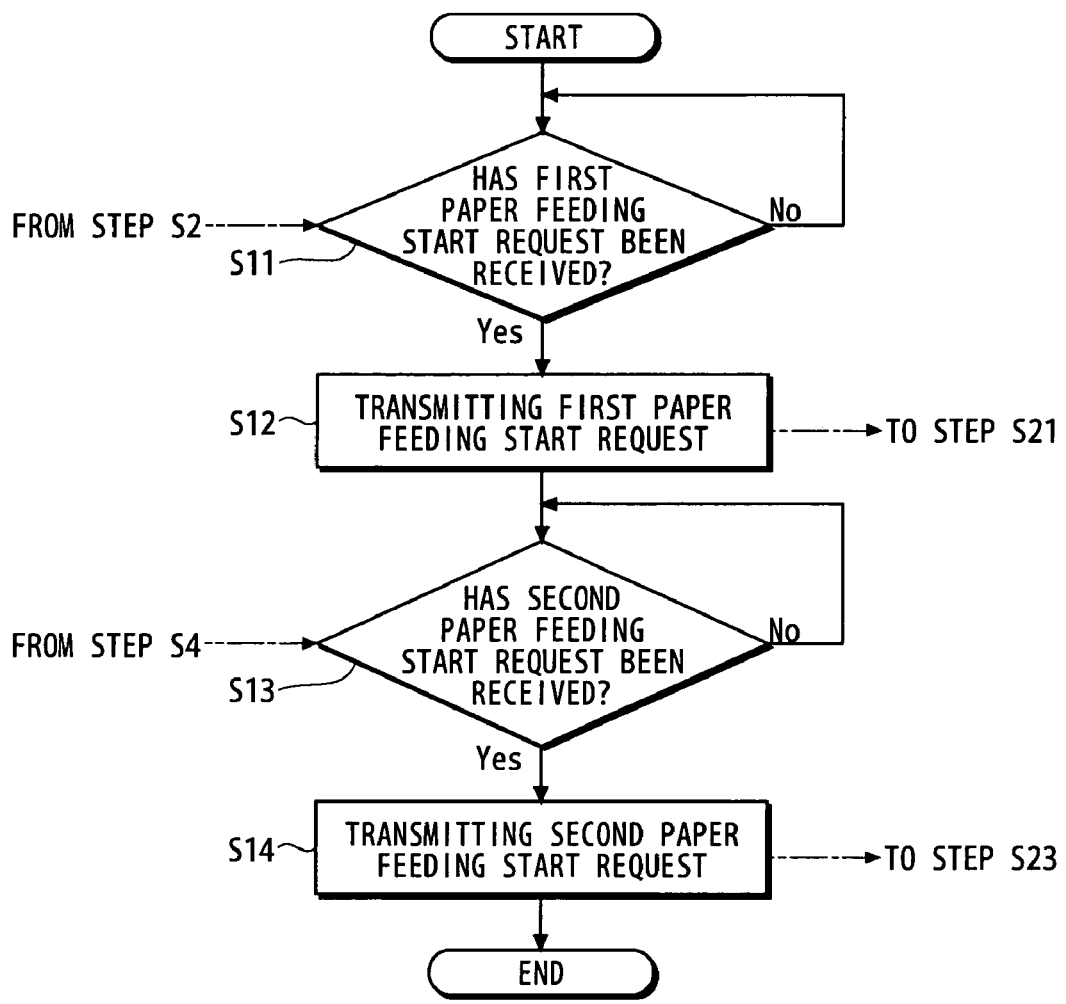

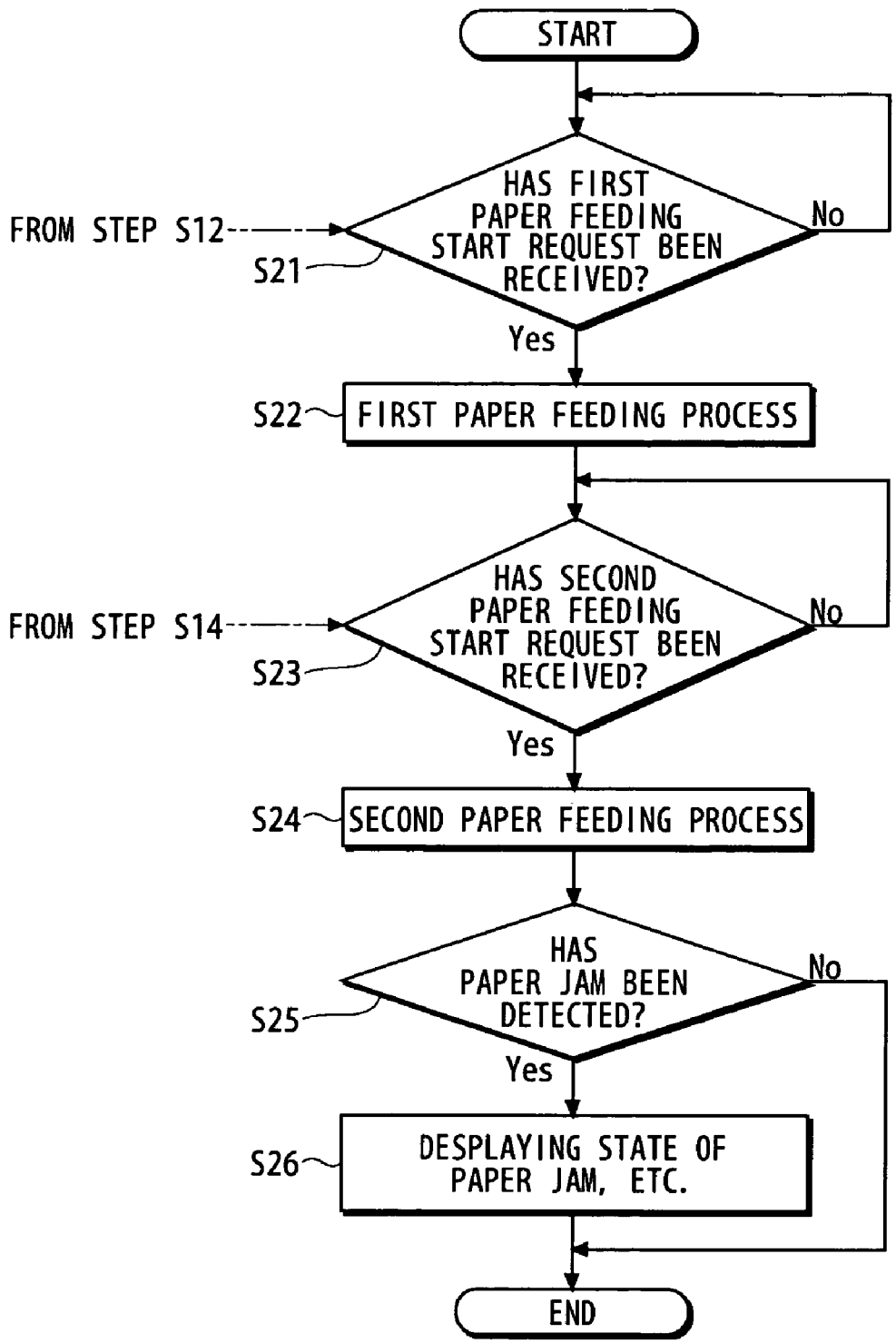

IMAGE FORMING APPARATUS

BACKGROUND OF THE INVENTION

1. Field of the Invention

The present invention relates to an image forming apparatus which in particular may be applied as a copier or an MFP (Multi-Function Peripheral) for instance.

2. Background Information

In coping by a copier, an MFP or the like, a sheet of printing paper would go through a first feeding process and a second feeding process. In the first feeding process, the printing paper would first be transferred from a paper cassette up to a registration roller. In the second feeding process, the printing paper would be transferred from the registration roller to an exit roller while going through a printing process.

In conventional art, in case of conducting a normal copying process, there are several possible means which have been applied to in order to accelerate a first copying speed (e.g. Japanese Laid-Open Patent Application No. 6-102727 (hereinafter to be referred to as Patent Reference 1) and Japanese Laid-Open Patent Application No. 2000-2558415 (hereinafter to be referred to as Patent Reference 2)). One means is to go ahead with the first paper feeding process, while scanning a manuscript and without waiting the scanning process of the manuscript to be finished by transmitting a print start event (i.e. a first paper feeding start request) from a scanner to a printing controller and then transmitting the first paper feeding start request from the printing controller to a paper feeder controller. Another means is to accelerate a transmitting speed in the first paper feeding.

On the other hand, in case of conducting a graphics editing process such as a scaling process, a rotating process and the like using the scanner, problems such as processing time for graphics editing becoming unstable and so forth may occur. In order to solve further possible problems caused by the problems as mentioned above, in the conventional art, as shown in FIG. 1, it is arranged such that the print start event (i.e. the first paper feeding start request) is transmitted from the scanner (1) to the printing controller (2) at the timing meeting completions of the manuscript scanning process and graphics editing process, and then the first paper feeding start request is transmitted from the printing controller (2) to the paper feeder controller (3). Moreover, it is arranged such that deciding the timing of the second paper feeding is completely entrusted to the paper feeder controller (3).

As mentioned above, in the conventional image forming apparatus, in case of conducting a graphics editing process such as a scaling process, a rotating process and the like using the scanner (1), the print start event is transmitted from the scanner (1) to the printing controller (2) at the timing meeting completions of the manuscript scanning process and graphics editing process. Therefore, in case of conducting a copying process which accompanies a graphics editing process, it is noted as a problem that the first copying speed will drop considerably as compared to the case of a normal copying process where the print start event is transmitted from the scanner (1) to the printing controller (2) while scanning the manuscript.

In view of the above, it will be apparent to those skilled in the art from this disclosure that there exists a need for an improved image forming apparatus. This invention addresses this need in the art as well as other needs, which will become apparent to those skilled in the art from this disclosure.

SUMMARY OF THE INVENTION

It is therefore an object of the present invention to resolve the above-described problems and to provide an image forming apparatus which is capable of accelerating a first copying speed in conducting copying which accompanies graphics editing.

In accordance with one aspect of the present invention, an image forming apparatus comprises a paper feeder controller, a scanner and a printing controller. The paper feeder controller executes a first paper feeding process and a second paper feeding process. The scanner executes a manuscript scanning process for optically scanning a manuscript and a graphics editing process for editing image being scanned, transmits a first paper feeding start request at timing between start of the manuscript scanning process and completion of the graphics editing process, and transmits a second paper feeding start request after the graphics editing process is completed. The first paper feeding start request is a request for making the paper feeder controller start the first paper feeding process, and the second paper feeding start request is a request for making the paper feeder controller start the second paper feeding process. The printing controller receives the first paper feeding start request and the second paper feeding start request from the scanner and controls the paper feeder controller based on the first paper feeding start request or the second paper feeder start request.

These and other objects, features, aspects, and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a sequence diagram explaining an operation of the image forming apparatus according to the present invention; and FIG. 4A to FIG. 4C are flow charts showing processes in the operation of the image forming apparatus according to the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 2:
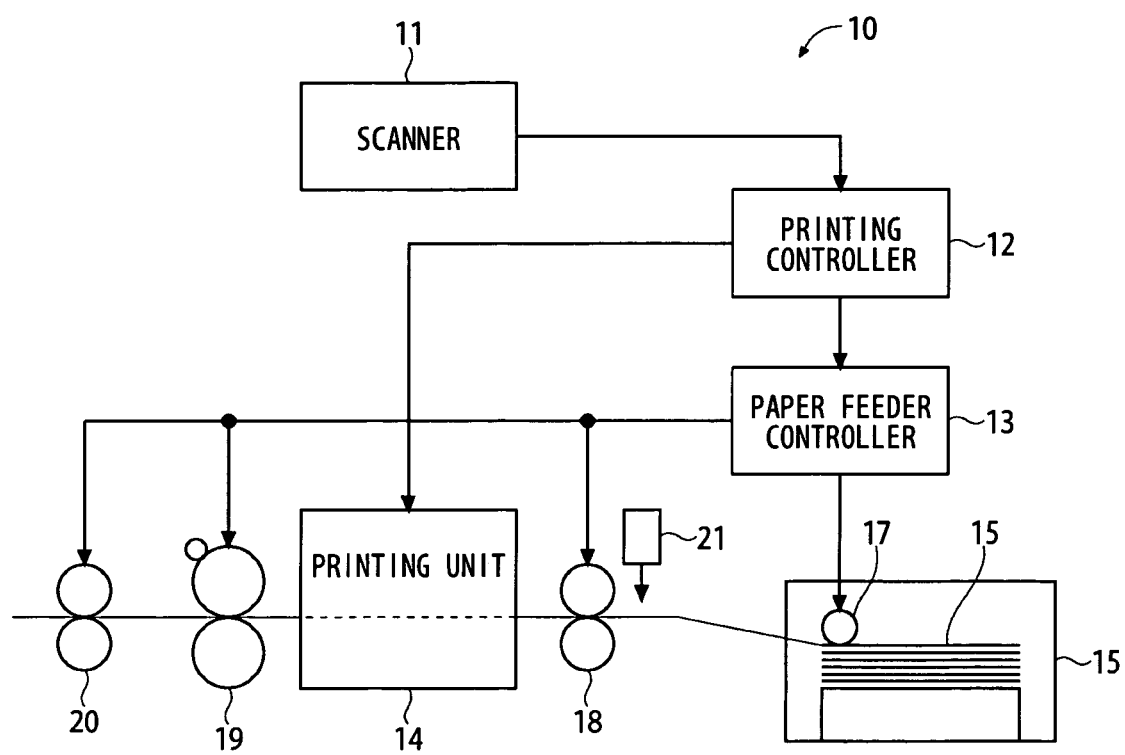
FIG. 2 is a block diagram showing an image forming apparatus which is one example of an embodiment of the present invention.

FIG. 2 is a block diagram showing an image forming apparatus 10 which is one example of an embodiment of the present invention. FIG. 3 is a sequence diagram explaining an operation of the image forming apparatus 10 according to the present invention. FIG. 4A to FIG. 4C are flow charts showing processes in the operation of the image forming apparatus 10 according to the present invention.

The image forming apparatus 10 according to this embodiment has a manuscript scanning function for optically scanning manuscripts and a graphics editing function for editing images being scanned, as shown in FIG. 2. Furthermore, the image forming apparatus 10 has a scanner (i.e. a scanning means) 11, a printing controller (i.e. a printing control means) 12, a paper feeder controller (i.e. a paper feeder control means) 13 and a printing unit 14. The scanner 11 serves to transmit to the printing controller 12 a paper feeding start request for making the paper feeder controller 13 start paper feeding to the printing unit 14. The printing controller 12 serves to receive the paper feeding start request from the scanner 11 and transmit the paper feeding start request to the paper feeder controller 13. The paper feeder controller 13 serves to receive the paper feeding start request from the printing controller 12, and upon receiving the paper feeding start request, execute a first paper feeding process and a second paper feeding process for feeding printing paper to the printing unit 14 on the basis of the received paper feeding start request. The printing unit 14 serves to print images.

Here, the first paper feeding process executed by the paper feeder controller 13 indicates a process of picking up sheets of printing paper 15 one by one from a paper cassette 16 using a feeding roller 17 and feeding the printing paper 15 to a registration roller 18 which is arranged in front of the printing unit 14. The second paper feeding process executed by the paper feeder controller 13 indicates a process of sending the printing paper 15 from the registration roller 18 to the printing unit 14, and upon completing a printing process, discharging the printing paper 15 via a fixing roller 19, an exit roller 20, etc. The feeding roller 17, the registration roller 18, the fixing roller 19, the exit roller 20, etc. are driven by the paper feeder controller 13 controlling a driving circuit (not shown) of each of these rollers.

The scanner 11 has an image scaling function and a rotating function as a graphics editing function. In this embodiment, as shown in FIG. 3, the scanner 11 transmits a request for starting the first paper feeding process (hereinafter to be referred to as a first paper feeding start request) to the printing controller 12 at the timing of manuscript scanning being started as a copy button (nor shown) is being pressed, and after completion of a graphics editing process, the scanner 11 transmits a request for starting a second paper feeding process (hereinafter to be referred to as the second paper feeding start request) to the printing controller 12.

The printing controller 12 serves to controls the printing unit 14. Furthermore, the printing controller 12 receives the first paper feeding start request from the scanner 11 and transmits the first paper feeding start request to the paper feeder controller 13, and also receives the second paper feeding start request from the scanner 11 and transmits the second paper feeding start request to the paper feeder controller 13, as shown in FIG. 3.

The paper feeder controller 13 receives the first paper feeding start request from the printing controller 12, and on the basis of the received first paper feeding start request, it lets the printing paper 15 be sent from the paper cassette 16 to the registration roller 18 and puts the printing paper 15 on standby at a position of the registration roller 18 by controlling a driving circuit of the feeding roller 17, as shown in FIG. 2 and FIG. 3.

In this embodiment, as shown in FIG. 2, a jam sensor (i.e. a paper jam detection means) 21 for detecting a paper jam is disposed in the vicinity of the registration roller 18. A signal from the jam sensor 21 is to be outputted to the paper feeder controller 13. In case when a period of time ranging from a completion of the first paper feeding process to a start of the second paper feeding process exceeds a predetermined period of time, i.e. in case when a standby period of the printing paper 15 at the position of the registration roller 18 exceeds a predetermined period of time, the paper feeder controller 13 identifies a presence of a paper jam based on the signal received from the jam sensor 21. As the paper feeder controller 13 identifies the paper jam in this way, it displays on a liquid display means etc. (not shown) of the image forming apparatus 10 that it is in a state of paper jam, and at the same time, the paper feeder controller 13 stops the printing process of the printing unit 14.

Therefore, in case when the processing time for graphics editing by the scanner 11 becomes longer, the scanner 11 will not be able to transmit the second paper feeding start request to the printing controller 12 within the predetermined period of time, and the standby period of the printing paper 15 at the position of the registration roller 18 will become longer. In this case, an error detection of paper jam may possibly happen even when the device is in a normal state.

In order to prevent such error detection of paper jam, in this embodiment, it is arranged such that an instruction to not letting the paper feeding controller 13 detect any paper jam until the second paper feeding start request is received by the paper feeder controller 13 is attached to the first paper feeding start request transmitted from the printing controller 12 to the paper feeder controller 13, or it is arranged such that the paper feeder controller 13 will detect paper jam only after receiving the second paper feeding start request from the printing controller 12, and thereby a process for detecting paper jam will actually start after the second feeding process starts.

As the paper feeder controller 13 receives the second paper feeding start request from the printing controller 12, it feeds the printing paper 15 to the printing unit 14 by controlling the driving circuits of the registration roller 18, the fixing roller 19 and the exit roller 20, respectively, at predetermined timing. After this operation, images will be printed on the printing paper 15 by the printing unit 14, the printing paper 15 with the printed images will then go through a fixing process and a pressure bonding process etc. at the fixing roller 19, and the printing paper 15 after being processed in this way will be discharged by the exit roller 20.

Now, with reference to FIG. 4A to FIG. 4C, one example of an operation of the image forming apparatus 10 having the structure as described above will be described. FIG. 4A is a flow chart of an operation by the scanner 11, FIG. 4B is a flow chart of an operation by the printing controller 12, and FIG. 4C is a flow chart of an operation by the paper feeder controller 13.

First, as shown in FIG. 4A, the scanner 11 determines whether manuscript scanning has started or not, in step S1. When it is determined that the manuscript scanning has actually started (Yes of Step S1), the scanner 11 transmits the first paper feeding start request to the printing controller 12, in step S2. In step S3, the scanner 11 determines whether a graphics editing process has been completed. When it is determined that the graphics editing process has actually been completed (Yes of Step S3), the scanner 11 transmits the second paper feeding start request to the printing controller 12, in step S4.

On the other hand, as shown in FIG. 4B, the printing controller 12 determines whether the first paper feeding start request (Step S2) has been received from the scanner 11, in step S11. When it is determined that the first paper feeding start request has actually been received (Yes of Step S11), the printing controller 12 transmits the first paper feeding start request to the paper feeder controller 13, in step S12. In step S13, the printing controller 12 determines whether the second paper feeding start request (step S4) has been received from the scanner 11. When it is determined that the second paper feeding start request has actually been received (Yes of Step S13), the printing controller 12 transmits the second paper feeding start request to the paper feeder controller 13, in step S14.

On the other hand, as shown in FIG. 4C, the paper feeder controller 13 determines whether the first paper feeding start request (step S12) has been received from the printing controller 12, in step S21. When it is determined that the first paper feeding start request has actually been received (Yes of Step S21), the paper feeder controller 13 controls the driving circuit of the feeding roller 17 to conduct the first paper feeding process for letting the printing paper 15 be fed from the paper cassette 16 to the registration roller 18 and be put on standby at the position of the registration roller 18, in step S22.

Next, the paper feeder controller 13 determines whether the second paper feeding start request (step S14) has been received from the printing controller 12, in step S23. When it is determined that the second paper feeding start request has actually been received (Yes of Step S23), the paper feeder controller 13 executes the second paper feeding process for letting the printing paper 15 be fed from the registration roller 18 to the printing unit 14, and after the printing process is done, it letting the printing paper 15 be discharged via the fixing roller 19 and the exit roller 20 etc. by controlling the driving circuits of the registration roller 18, the fixing roller 19 and the exit roller 20, respectively, at predetermined timing.

Moreover, the paper feeder controller 13 determines whether a paper jam has been detected after the second paper feeding process is started, in step S25. When it is determined that the paper jam has actually been detected (Yes of Step S25), the paper feeder controller 13 displays a state of paper jam on the liquid display means etc. (not shown) of the image forming apparatus 10 and stops the printing process of the printing unit 14, in step S26.

Now, with reference to FIG. 3 and FIG. 1, a comparison between a first copying time in this embodiment (FIG. 3) and a first copying time in the conventional case (FIG. 1) will be made. Here, transmission time of the first paper feeding start request and the second paper feeding start request is set to zero.

Figure 1:
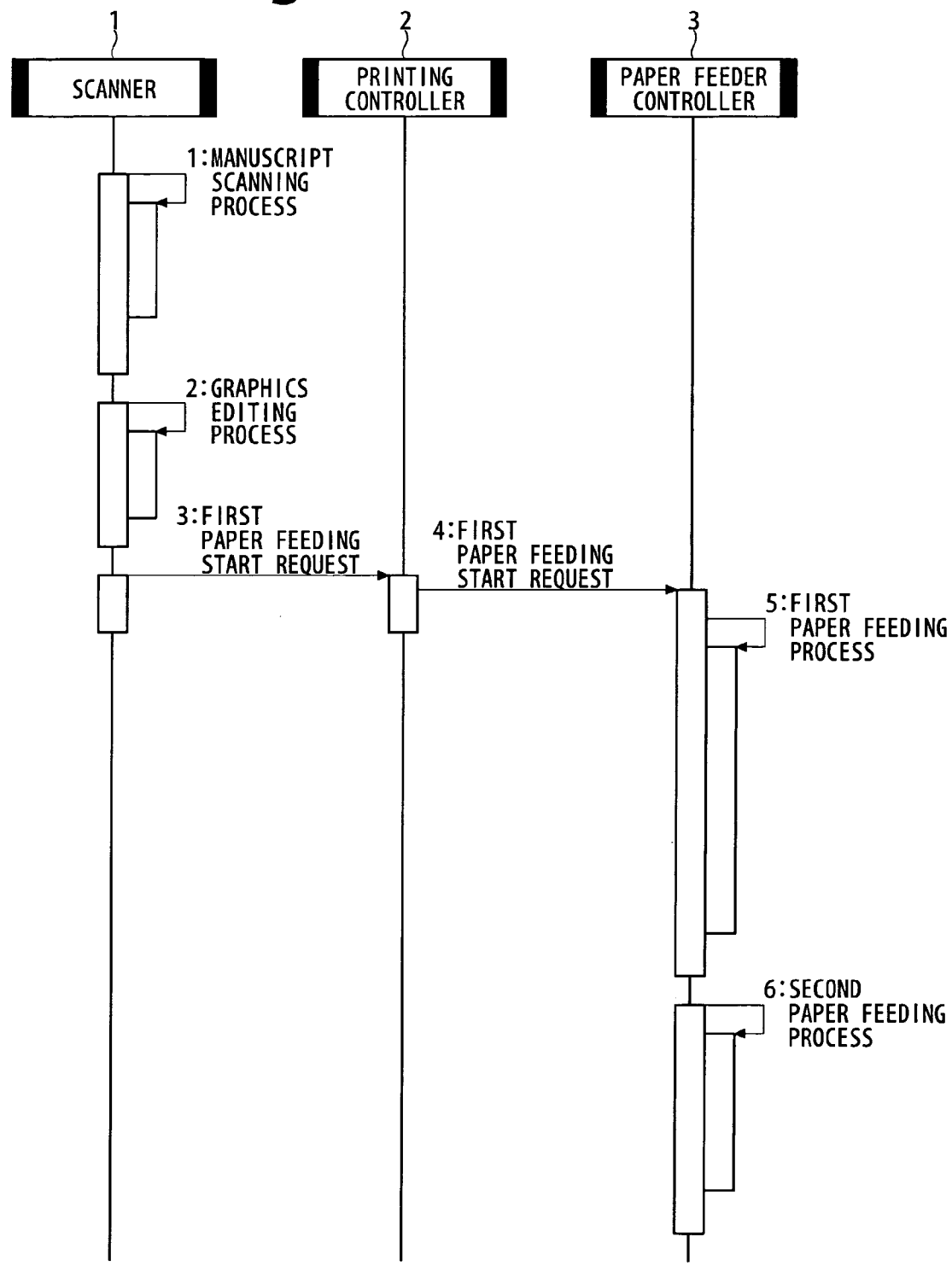
FIG. 1 is a sequence diagram explaining an operation of an image forming apparatus according to a conventional art.

In the conventional case shown by a sequence diagram of FIG. 1, the first copying time can be calculated as: first copying time=scanning time+graphics editing time+first paper feeding time+second paper feeding time.

On the other hand, in the case of the present invention shown by the sequence diagram of FIG. 3, if first paper feeding time is longer than the sum of scanning time and graphics editing time (i.e. first paper feeding time>scanning time+graphics editing time), the first copying time can be calculated as: first copying time=first paper feeding time+ second paper feeding time. If the first paper feeding time is shorter than the sum of scanning time and graphics editing time (i.e. first paper feeding time<scanning time+graphics editing time), the first copying time can be calculated as: first copying time=scanning time+graphics editing time+second paper feeding time.

Here, considering the case of 'first paper feeding time>scanning time+graphics editing time', provided that the scanning time is 1000 msec (millisecond), the graphics editing time is 500 msec, the first paper feeding time is 2500 msec and the second paper feeding time is 2000 msec, the first copying time in the conventional case will be 1000+500+ 2500+2000=6000 msec. On the other hand, under the same conditions, the first copying time in the case of the present invention will be 2500+2000=4500 msec. Therefore, the first copying time in the case of the present invention can be shortened by 1500 msec as compared to the conventional case.

Now considering the case of 'first paper feeding time<scanning time+graphics editing time', provided that the scanning time is 1000 msec, the graphics editing time is 2000 msec, the first paper feeding time is 2500 msec and the second paper feeding time is 2000 msec, the first copying time in the conventional case will be 1000+2000+2500+2000=7500 msec. On the other hand, under the same conditions, the first copying time in the case of the present invention will be 1000+2000+2000=5000 msec. Therefore, the first copying time in the case of the present invention can be shortened by 2500 msec as compared to the conventional case.

As can be understood from the above description, according to the embodiment of the present invention, the scanner 11 transmits the request for starting the first paper feeding process to the printing controller 12 at the timing of manuscript scanning being started, and transmits the request for starting the second paper feeding to the printing controller 12 after the graphics editing process is finished. Accordingly, as compared to the conventional case where the request for starting the first paper feeding process is transmitted at the timing of the graphics editing process being finished, the present invention is capable of accelerating the first copying speed to a large degree.

In addition, according to the embodiment of the present invention, it is arranged such that the paper jam detection process by the jam sensor 21 and the paper feeder controller 13 operates only after the second paper feeding starts. Therefore, according to the present invention, it is possible to unfailingly prevent any error detection of paper jam at the position of the registration roller 18.

The structure applying the scanner, printing controller, paper feeder controller, printing paper, paper cassette, registration roller, paper jam detection function, graphics editing function, etc. are not limited to the one described above with respect to the embodiment of the present invention, and it is obvious to those skilled in the art that changes and variations may be made without departing from the scope of the invention.

For instance, in the above-described embodiment, in order to accelerate the first copying speed, it is arranged that the scanner 11 should transmit the start request for the first paper feeding at the timing of manuscript scanning being started. However, this is not a limiting condition for the present invention. It is also possible to have the scanner 11 transmit the start request for the first paper feeding at arbitrary timing within a period ranging from the start of manuscript scanning to the end of graphics editing process of the graphics being scanned.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

Moreover, terms that are expressed as "means-plus function" in the claims should include any structure that can be utilized to carry out the function of that part of the present invention.

What is claimed is:

1. An image forming apparatus comprising:
a paper feeder controller executing a first paper feeding process and a second paper feeding process;
a scanner executing a manuscript scanning process for optically scanning a manuscript and a graphics editing process for editing image being scanned, transmitting a first paper feeding start request at timing between start of the manuscript scanning process and completion of the graphics editing process, and transmitting a second paper feeding start request after the graphics editing process is completed, the first paper feeding start request being a request for making the paper feeder controller start the first paper feeding process, the second paper feeding start request being a request for making the paper feeder controller start the second paper feeding process; and
a printing controller receiving the first paper feeding start request and the second paper feeding start request from the scanner and controlling the paper feeder controller based on the first paper feeding start request or the second paper feeder start request.

2. The image forming apparatus according to claim 1, wherein
the paper feeder controller feeds printing paper from a paper cassette to a registration roller in the first paper feeding process and discharges the printing paper via registration roller and a printing unit in the second paper feeding process, the registration roller being arranged in front of the printing unit.

3. The image forming apparatus according to claim 2, further comprising:
a jam sensor arranged near the registration roller, the jam sensor detecting paper jam and inputting a detected result to the paper feeder controller; wherein
the paper feeder controller executes a paper jam detection process for detecting paper jam based on the detected result by the jam sensor only after the second paper feeding process is started.

4. The image forming apparatus according to claim 1, wherein
the scanner transmits the first paper feeding start request at the time when the manuscript scanning process is started.

5. The image forming apparatus according to claim 2, wherein
the scanner transmits the first paper feeding start request at the time when the manuscript scanning process is started.

6. The image forming apparatus according to claim 3, wherein
the scanner transmits the first paper feeding start request at the time when the manuscript scanning process is started.

7. The image forming apparatus according to claim 1, wherein
the graphics editing process includes at least an image scaling process and a rotating process.

8. The image forming apparatus according to claim 2, wherein
the graphics editing process includes at least an image scaling process and a rotating process.

9. The image forming apparatus according to claim 3, wherein
the graphics editing process includes at least an image scaling process and a rotating process.

10. The image forming apparatus according to claim 4, wherein
the graphics editing process includes at least an image scaling process and a rotating process.

11. The image forming apparatus according to claim 5, wherein
the graphics editing process includes at least an image scaling process and a rotating process.

12. The image forming apparatus according to claim 6, wherein
the graphics editing process includes at least an image scaling process and a rotating process.

* * * * *